US 6,846,015 B2
Jan. 25, 2005

(54) ENERGY ABSORBING KNEE BOLSTER

(75) Inventors: Alex G. Meduvsky, Romeo, MI (US);
Matthew C. Frank, Rochester Hills, MI (US); Arnold J. Herberg, Davisburg, MI (US); Joseph J. Zwolinski, Warren, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 10/238,530

(22) Filed: Sep. 10, 2002

(65) Prior Publication Data
US 2004/0046377 A1 Mar. 11, 2004

(51) Int. Cl.⁷ ............................................. B60R 21/045
(52) U.S. Cl. ................. 280/753; 280/752; 296/187.05; 188/188; 188/267.1; 188/267.2
(58) Field of Search ................. 280/751–753; 188/267.1, 267.2; 296/187.05

(56) References Cited

U.S. PATENT DOCUMENTS

| | | | |
|---|---|---|---|
| 4,951,963 A | * 8/1990 | Behr et al. ................... 280/753 |
| 5,131,681 A | * 7/1992 | Wetzel et al. ............... 280/753 |
| 5,902,006 A | 5/1999 | Janker et al. |
| 6,019,392 A | 2/2000 | Karlow |
| 6,152,488 A | * 11/2000 | Hedderly et al. ........... 280/775 |
| 6,234,526 B1 | 5/2001 | Song et al. |
| 6,279,952 B1 | * 8/2001 | Van Wynsberghe et al. ..... 280/777 |
| 6,283,508 B1 | * 9/2001 | Nouwynck et al. ......... 280/753 |
| 6,296,280 B1 | * 10/2001 | Struble et al. .............. 280/777 |
| 6,354,626 B1 | * 3/2002 | Cartwright ................... 280/777 |
| 6,471,018 B1 | * 10/2002 | Gordaninejad et al. .. 188/267.1 |
| 6,641,166 B2 | * 11/2003 | Browne et al. ............. 280/752 |
| 2002/0190514 A1 | * 12/2002 | Mueller ...................... 280/753 |
| 2003/0090096 A1 | * 5/2003 | Borde et al. ................ 280/752 |

* cited by examiner

Primary Examiner—Ruth Ilan
(74) Attorney, Agent, or Firm—Tarolli, Sundheim, Covell & Tummino L.L.P.

(57) ABSTRACT

An apparatus (10) for helping to protect an occupant (28) of a vehicle (12) includes a knee bolster (20). An energy absorbing device (80) is interposed between the knee bolster (20) and the vehicle (12). The device (80) includes a field responsive fluid (84) having a viscosity that varies in response to an energy field acting on the fluid. The device (80) also includes at least one passage (134) through which the fluid (84) flows upon movement of the knee bolster (20) relative to the vehicle (12). The device (80) further includes means (150) for varying the viscosity of the fluid (84) to vary the flow rate through the at least one passage (134) and thereby vary the resistance to movement of the knee bolster (20) relative to the vehicle (12).

11 Claims, 10 Drawing Sheets

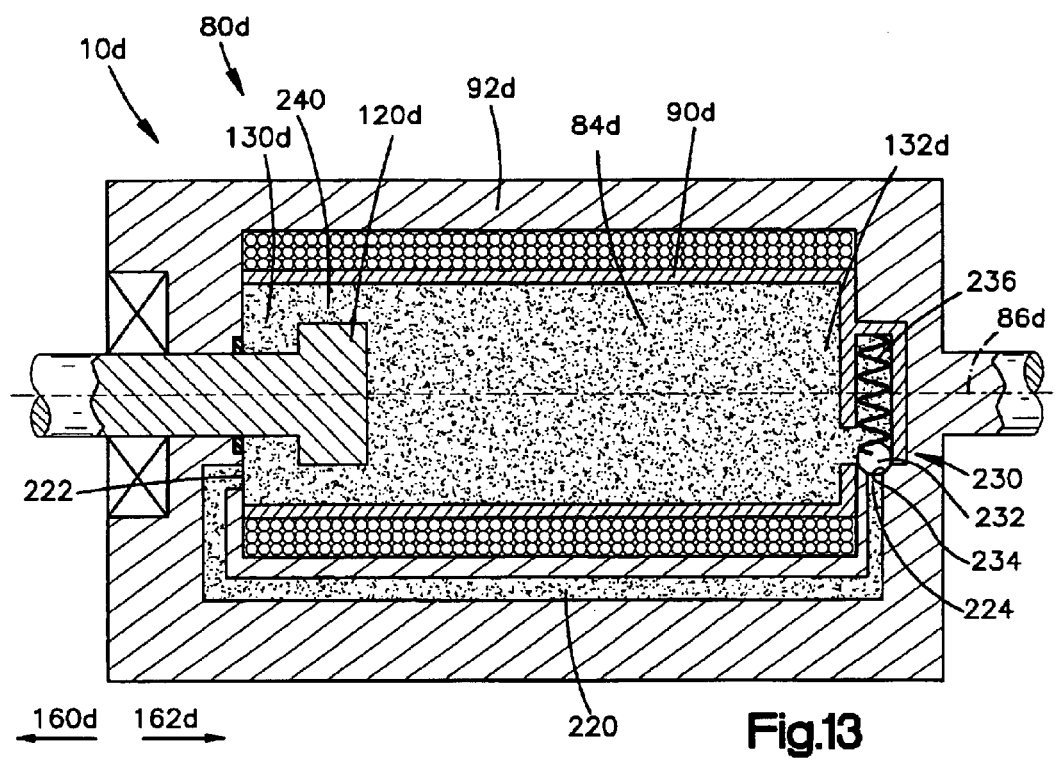

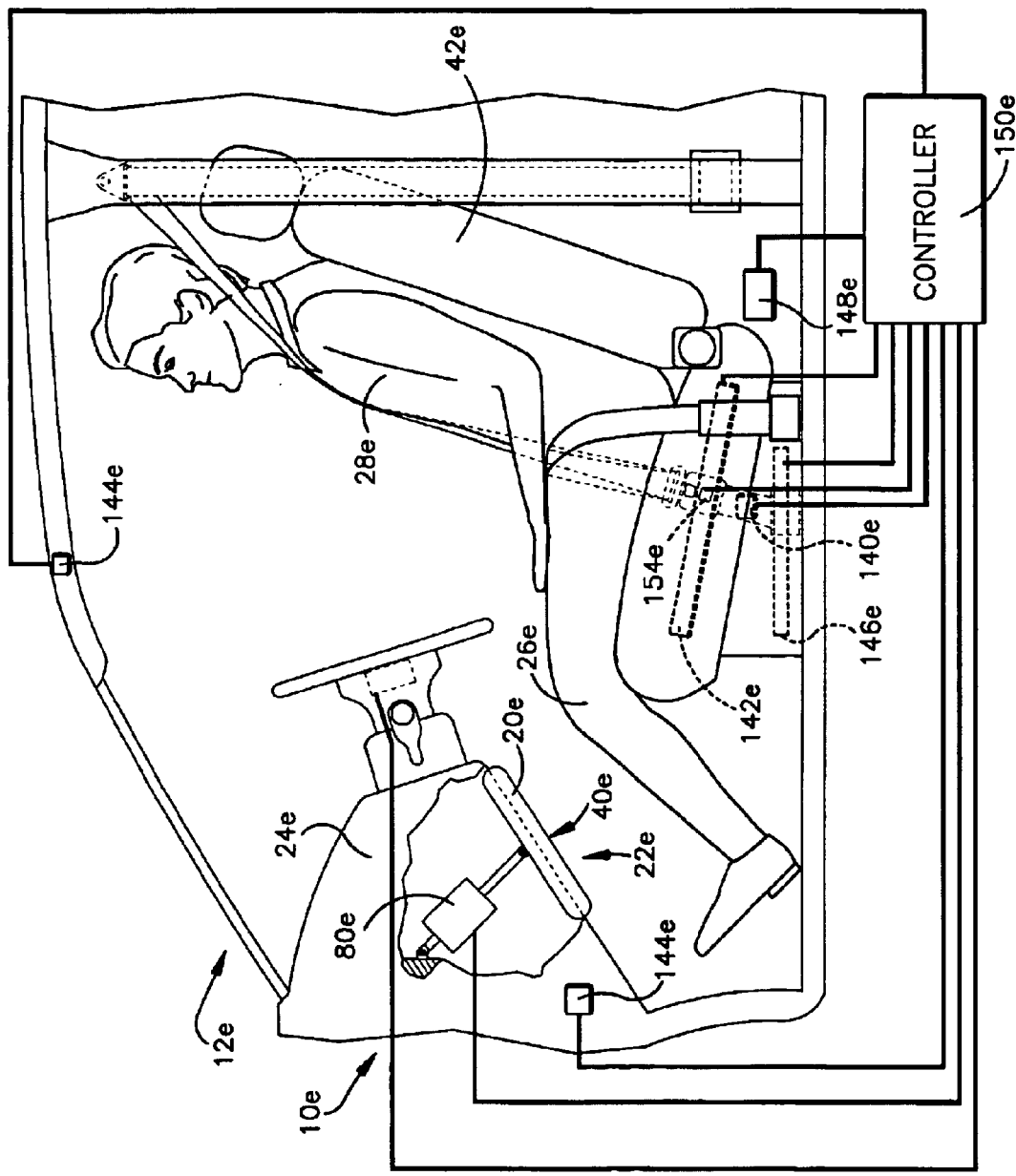

ENERGY ABSORBING KNEE BOLSTER

TECHNICAL FIELD

The present invention relates to an apparatus for helping to protect an occupant of a vehicle. More particularly, the present invention relates to an apparatus including a knee bolster and an energy absorbing device for helping the knee bolster absorb energy from impacts with the knee bolster.

BACKGROUND OF THE INVENTION

Actuatable knee bolsters for helping to protect a vehicle occupant are known in the art. Such a knee bolster is typically located at a lower portion of a vehicle instrument panel and is movable from a stored position to a deployed position in response to detection of a condition for which occupant protection is desirable. The knee bolster can help to prevent the vehicle occupant from sliding under or "submarining" beneath an inflated air bag. The knee bolster can also help absorb energy of impacts with the knee bolster, such as impacts that occur during a vehicle collision.

SUMMARY OF THE INVENTION

The present invention relates to an apparatus for helping to protect an occupant of a vehicle. The apparatus includes a knee bolster and an energy absorbing device interposed between the knee bolster and the vehicle. The device includes a field responsive fluid having a viscosity that varies in response to an energy field acting on the fluid. The device also includes at least one passage through which the fluid flows upon movement of the knee bolster relative to the vehicle. The device further includes means for varying the viscosity of the fluid to vary the flow rate through the at least one passage and thereby vary the resistance to movement of the knee bolster relative to the vehicle.

The present invention also relates to an apparatus including a knee bolster, a cylinder connected to the vehicle, and a piston movable in the cylinder along a longitudinal axis of the cylinder. The cylinder contains a volume of field responsive fluid and at least one passage through which the field responsive fluid flows when the piston moves in the cylinder. The apparatus also includes a shaft having a first end connected to the piston and an opposite second end connected to the knee bolster outside of the cylinder. The shaft is movable with the piston in the cylinder. The apparatus further includes means for varying the viscosity of the field responsive fluid to vary the rate of flow of the field responsive fluid through the at least one passage and thereby vary the resistance to movement of the knee bolster relative to the vehicle.

The present invention also relates to an apparatus including a knee bolster and a magneto-rheological fluid damper interposed between the knee bolster and the vehicle. The fluid damper provides resistance to movement of the knee bolster toward a dashboard of the vehicle. The apparatus also includes means for controlling the magneto-rheological fluid damper to vary the resistance to movement of the knee bolster toward the dashboard in accordance with at least one of sensed occupant and vehicle conditions.

The present invention also relates to an apparatus including a knee bolster and an energy absorbing device interposed between said knee bolster and the vehicle. The knee bolster is actuatable in a first direction away from a dashboard of the vehicle from a stored position to a deployed position. The energy absorbing device is operative to resist to movement of the knee bolster in a second direction toward the vehicle dashboard. The energy absorbing device comprises a field responsive fluid having a viscosity that varies in response to an energy field acting on said field responsive fluid. The energy absorbing device also comprises at least one passage through which said field responsive fluid flows upon movement of said knee bolster relative to the vehicle. The energy absorbing device further comprises means for varying the viscosity of the field responsive fluid to vary the rate of flow of said field responsive fluid through said at least one passage and thereby vary the resistance to movement of said knee bolster in the second direction.

The present invention further relates to an apparatus including a knee bolster actuatable in a first direction away from a dashboard of the vehicle from a stored position to a deployed position. The apparatus also includes a magneto-rheological fluid damper interposed between the knee bolster and the vehicle. The magneto-rheological fluid damper provides resistance to movement of the knee bolster in a second direction toward the vehicle dashboard. The apparatus further includes means for controlling the magneto-rheological fluid damper to vary the resistance to movement of the knee bolster in the second direction in accordance with at least one of sensed occupant and vehicle conditions.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIGS. 11–13 are schematic views of a portion of the apparatus of FIGS. 1 and 2 depicting the apparatus in a stored position, a mid-travel, and a deployed position, respectively, according to a fifth embodiment of the present invention; and FIG. 14 is a schematic view of an apparatus including an energy absorbing knee bolster depicting the knee bolster in a stored position, according to a sixth embodiment of the present invention.

DESCRIPTION OF THE INVENTION

Figure 1:
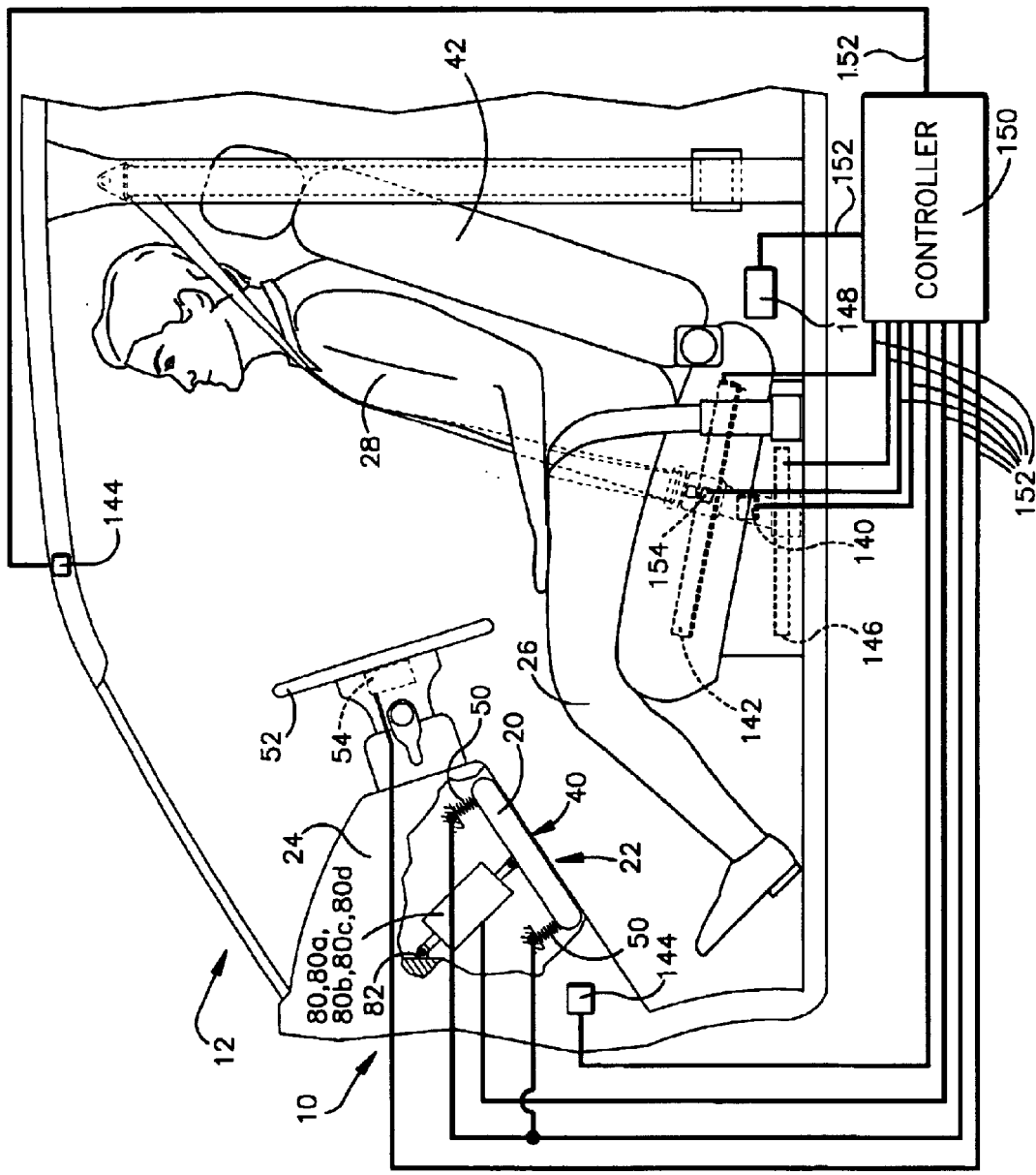
FIG. 1 is a schematic view of an apparatus including an energy absorbing knee bolster depicting the knee bolster in a stored position, according to an embodiment of the present invention.
Figure 2:
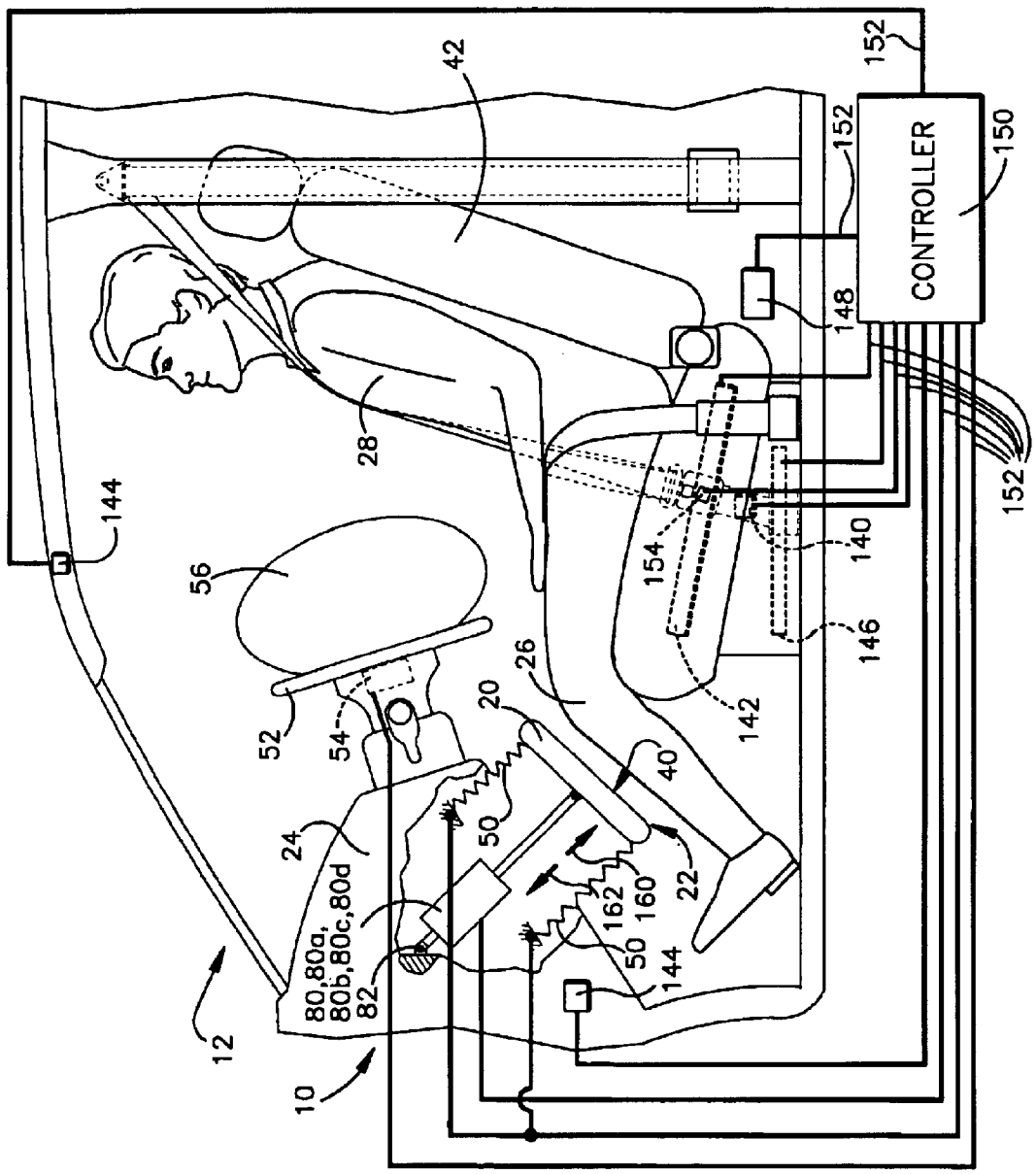
FIG. 2 is a schematic view of the apparatus of FIG. 1, depicting the energy absorbing knee bolster in a deployed position.

The present invention relates to an apparatus for helping to protect an occupant of a vehicle. In particular, the present invention relates to a vehicle occupant protection apparatus including an energy absorbing knee bolster. FIGS. 1 and 2 illustrate an apparatus 10 in accordance with an embodiment of the present invention.

The apparatus 10 includes a knee bolster 20 movable from a stored position (FIG. 1) to a deployed position (FIG. 2) in a vehicle 12. The knee bolster 20 is formed as part of a lower portion 22 of an instrument panel or dashboard 24 of the vehicle 12. The lower portion 22 of the instrument panel 24 is the portion of the instrument panel that legs 26 of an occupant 28 may engage if the occupant moves forward from a seated position to contact the instrument panel. It will be appreciated that the part of the occupant's legs 26 engaging the lower portion 22 and the knee bolster 20 may vary depending on factors such as the occupant's size and/or seating position and the configuration of the vehicle 12. In this description of the present invention, when reference is made to the occupant's legs 26 engaging the knee bolster 20, it is meant that any part (e.g., upper legs, knees, lower legs) of at least one of the occupant's legs engages the knee bolster.

In the illustrated embodiment, the knee bolster 20 forms a portion of the exterior surface of the vehicle instrument panel 24. The knee bolster 20 has an outer surface 40 that is presented generally downward and rearward in the vehicle 12 toward a seat 42 of the vehicle and toward the vehicle occupant 28. In this particular configuration, the knee bolster 20 may include a relatively soft material such as a resilient foam material covered by a skin material that matches the interior trim of the vehicle 12. Those skilled in the art, however, will appreciate that the knee bolster 20 of the present invention may have any suitable construction known in the art. For example, the knee bolster 20 could be constructed of a plastic material and/or may include an inflatable portion for helping to absorb impact forces.

The apparatus 10 includes means for actuating the knee bolster 20 from the stored position (FIG. 1) to the deployed position (FIG. 2). In the embodiment, the apparatus 10 includes a pair of actuators illustrated schematically at 50. The actuators 50 may have any suitable structure operative to move the knee bolster 20 from the stored position (FIG. 1) to the deployed position (FIG. 2). For example, the actuators 50 may comprise hydraulic or pneumatic actuators, such as piston/cylinder arrangements. Alternatively, the actuators 50 may comprise an inflatable device that, when inflated, moves the knee bolster from the stored position to the deployed position. As another alternative, the actuators 50 could be pyrotechnic actuators or spring loaded actuators. As a further alternative, the actuators may have any configuration suitable to move the knee bolster 20 from the stored position to the deployed position.

The vehicle 12 may also include an air bag module 54 mounted on a steering wheel 52 of the vehicle 12. The air bag module 54 includes an air bag 56 (FIG. 2) and an inflator (not shown). The inflator is actuatable to inflate and deploy the air bag 56 from an non-inflated position (FIG. 1) to an inflated position (FIG. 2).

Figure 3:
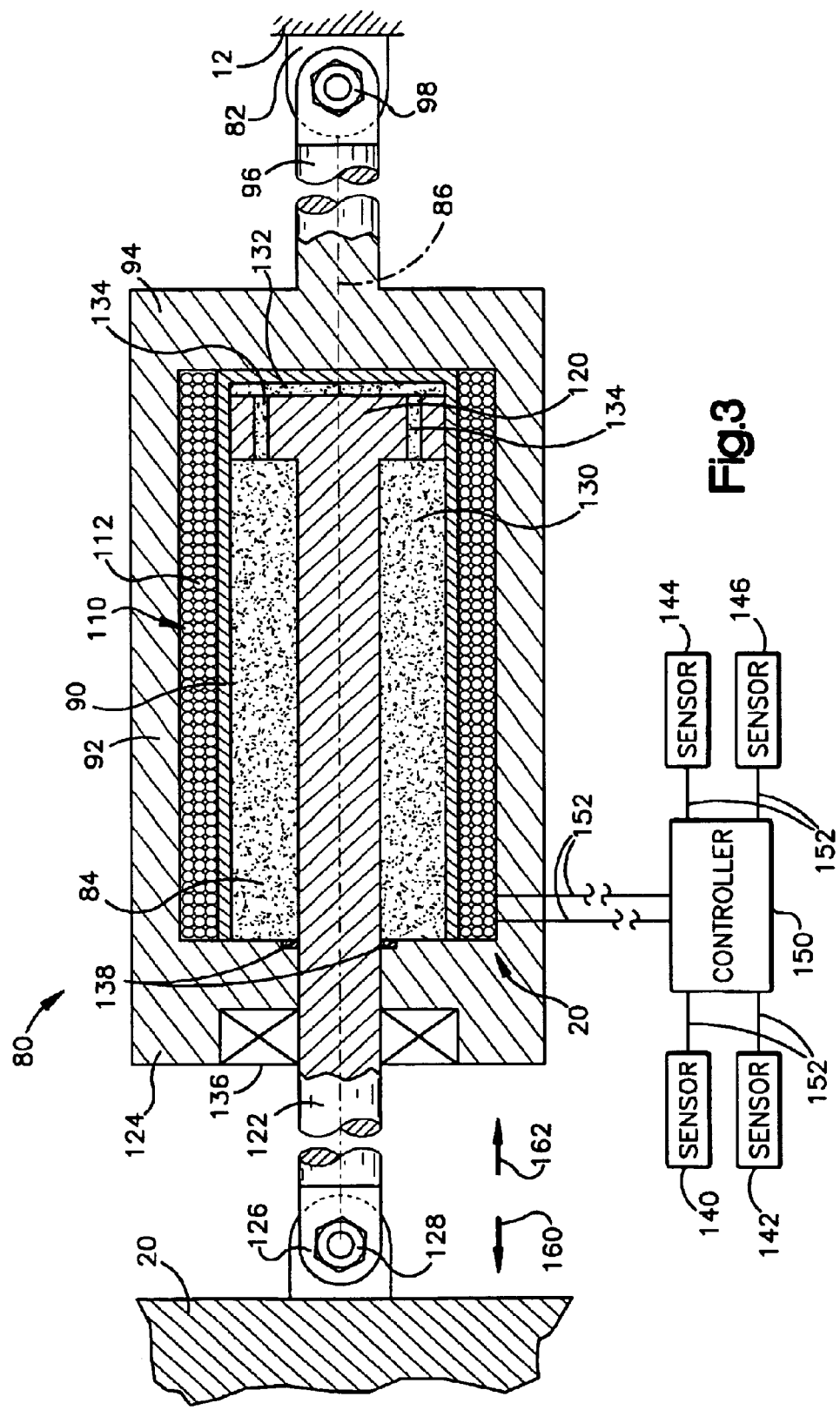
FIG. 3 is a schematic view, partially in section, of a portion of the apparatus in the stored position of FIG. 1.
Figure 4:
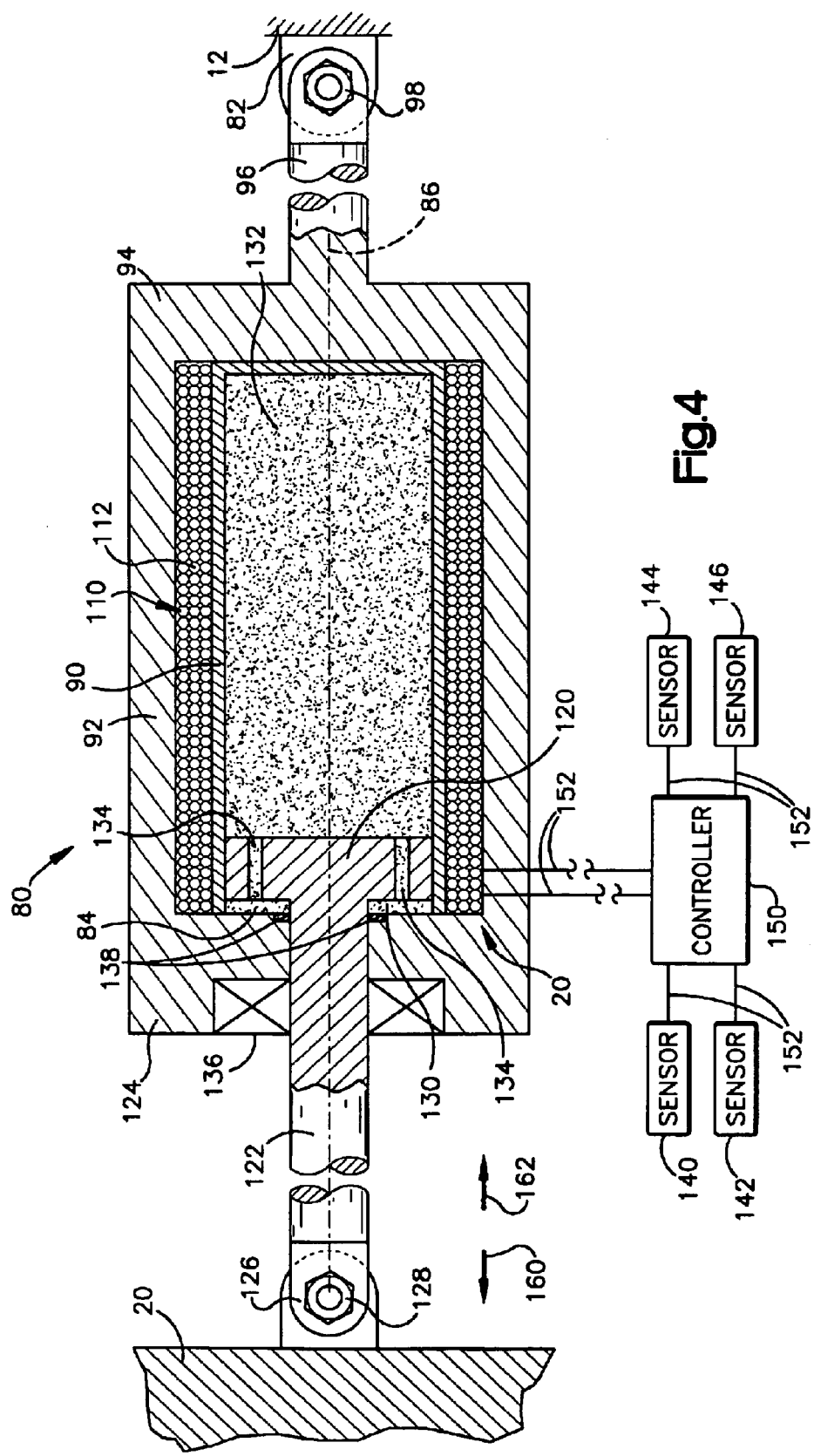
FIG. 4 is a schematic view, partially in section, of a portion of the apparatus in the deployed position of FIG. 2.

The apparatus 10 also includes an energy absorbing device 80. The energy absorbing device 80 is interposed between the vehicle 12, at a location identified schematically at 82, and the knee bolster 20. The energy absorbing device 80 helps to control movement of the knee bolster 20 relative to the vehicle 12. The energy absorbing device 80 is illustrated in greater detail in FIGS. 3 and 4. FIG. 3 illustrates the energy absorbing device 80 in a first non-actuated condition that corresponds to FIG. 1. FIG. 4 illustrates the energy absorbing device 80 in a second actuated condition that corresponds to FIG. 2.

Referring to FIGS. 3 and 4, the energy absorbing device 80 has a generally cylindrical configuration with a longitudinal axis 86. The energy absorbing device 80 includes a quantity of fluid 84. The fluid 84 is a fluid of which the viscosity can be varied by applying an energy field to the fluid. The fluid 84 is preferably a magneto-rheological fluid, hereinafter referred to as an "MR" fluid. The viscosity of an MR fluid can be varied by controlling the strength of a magnetic field applied to the fluid.

The MR fluid 84 is contained in a fluid cylinder 90. The cylinder 90 is supported in a housing 92. The housing 92 has a first end 94 from which a mounting rod portion 96 protrudes along the axis 86. The mounding rod portion 96 is fixed to the vehicle 12 at the location 82 via means 98, such as a fastener. The housing 92 may be connected to the vehicle 12 such that the housing may pivot about the mounting location 82.

The energy absorbing device 80 also includes a coil 110 that has a plurality of windings 112. The windings 112 extend around the fluid cylinder 90. The windings 112, when energized by an electric current over lead wires 152, generate a magnetic field, which extends through and acts on the MR fluid 84. The lead wires 152 are connected to a controller 150, such as a microprocessor, described below in more detail.

A piston 120 is located in the cylinder 90. The piston 120 is fixed to a shaft 122, which extends along the axis 86 through the cylinder 90 and out of a second end 124 of the housing 92 opposite the first end 94. The second end 124 of the housing 92 may include means 136 such as a bearing for helping to facilitate movement of the shaft 122 through the second end. The second end 124 of the housing 92 may also include a seal 138 for helping to seal the MR fluid 84 in the cylinder 90 and prevent leakage of the MR fluid through the second end. An end 126 of the shaft 122 is connected to the knee bolster 20 by means 128, such as a fastener. The connection between the shaft 122 and the knee bolster 20 may permit the knee bolster to pivot relative to the shaft and relative to the energy absorbing device 80.

The piston 120 is slidable in the cylinder 90 from the first condition (FIG. 3) to the second condition (FIG. 4). The energy absorbing device 80 thus has a stroke length that may be measured as the distance the piston travels between the first and second conditions. The piston 120 divides the cylinder into an upper portion 130 and a lower portion 132. A plurality of openings in the form of passages 134 are formed in the piston 120. The passages 134 establish fluid communication through the piston 120 between the upper cylinder portion 130 and the lower cylinder portion 132. Although only two such passages 134 are illustrated in FIGS. 3 and 4, it will be appreciated that the piston 120 may include any number of such passages.

The MR fluid 84 resists axial movement of the piston 120 in the cylinder 90. If the viscosity of the MR fluid 84 is low enough, the fluid in the cylinder 90 can flow through the passages 134 in the piston 120. This enables the piston 120 to move in the cylinder 90 through the body of MR fluid 84, along the axis 86 of the energy absorbing device 80. If the viscosity of the MR fluid 84 is high enough, the fluid cannot flow through the passages 134, thereby blocking movement of the piston 120 in the cylinder 90. Varying the viscosity of the MR fluid 84 thus varies the rate of flow of the fluid through the passages 134, and thereby varies the resistance to movement of the piston 120 axially in the cylinder 90. As a result, it will be appreciated that this varies the resistance to movement of the knee bolster 20 relative to the vehicle 12.

The vehicle 12 may include one or more occupant condition sensors of several known types. The occupant condition sensors are operative to sense the position of the occupant in the vehicle and/or the size or weight of the occupant. Referring to FIGS. 1 and 2, the vehicle 12 may include a seatbelt tension sensor 140, a seat weight sensor 142, occupant position sensors 144, a seat position sensor 146, and a seat belt buckle switch 154. The occupant condition sensors 140, 142, 144, 146, and 154 are operatively connected to the controller 150 via respective lead wires 152.

The vehicle 12 also includes at least one vehicle condition sensor 148 (FIG. 1) operative to detect an event for which occupant protection is desired, such as a vehicle collision. The vehicle condition sensor 148 may be any of several known types. For example, the vehicle condition sensor 148 may be a deceleration sensor such as a mechanical inertia switch or an accelerometer. The vehicle condition sensor 148 is operatively connected to the controller 150 via lead wires 152. The vehicle condition sensor 148 is thus operative to provide signals to the controller 150 indicative of a sensed event for which occupant protection is desired.

The controller 150 is also operatively connected to the air bag module 54 via the lead wires 152. The controller 150 incorporates one of several algorithms known in the art for determining whether to deploy the air bag 56. Upon the occurrence of an event for which protection of the vehicle occupant may be desired, the occupant condition sensors 140, 142, 144, 146, and 154 and the vehicle condition sensor 148 provides appropriate output signals to the controller 150. The controller 150 uses these output signals in a known manner to determine whether to deploy the air bag 56. For example, the controller 150 may compare the output signals of the sensors 140, 142, 144, 146, 154, and 148 with outputs found in a look-up table to determine whether to deploy the air bag 56. Alternatively, the controller 150 could be operative to deploy the air bag 56 immediately upon sensing a condition for which occupant protection is desired. As a further alternative, the air bag 56 could be operatively connected directly to the vehicle condition sensor 148 and deployed immediately upon sensing a condition for which occupant protection is desired.

The controller 150 is operative to control operation of the actuators 50 to deploy the knee bolster 20 upon detection of a condition for which occupant protection is desired. The actuators 50, when actuated, move the knee bolster 20 in a first direction away from the vehicle instrument panel 24 toward the vehicle occupant 28 from the stored position of FIG. 1 to the deployed position of FIG. 2. The first direction is indicated generally by the arrow labeled 160 in FIGS. 2–4. The knee bolster 20, when in the deployed position, is positioned to contact the legs 26 of the vehicle occupant 28 as the occupant moves forward in the vehicle 12. The knee bolster 20, when in the deployed position, thus helps block further lower extremity movement of the vehicle occupant 28 in a forward direction in the vehicle 12. This may help protect the occupant 28 by preventing further forward movement of the occupant 28 in the vehicle, by preventing contact between the occupant and the instrument panel 24, and by preventing the vehicle occupant from sliding or otherwise moving beneath the inflated air bag 56. The knee bolster 20 may also help absorb impact forces with the occupant's knee or legs.

When the actuators 50 are actuated to move the knee bolster 20 to the deployed position, the controller 150 is operative to de-energize the coil 110 so that there is a low resistance to movement of the piston 120 in the cylinder 90. Once the knee bolster 20 is moved to the deployed position, for example, after a time delay sufficient for the knee bolster to deploy has elapsed, the controller 150 controls energization of the coil to vary the resistance to movement of the piston 120 in the cylinder 90. Specifically, the controller 150 varies the resistance to movement of the piston 120 in a second direction, opposite the first direction, generally toward the instrument panel 24. The second direction is indicated generally by the arrow labeled 162 in FIGS. 2–4. This, in turn, helps to control resistance to movement of the knee bolster 20 in the second direction and thus helps to control the energy absorbing capacity of the knee bolster.

The controller 150 controls the operation of the energy absorbing device 80 in response to the outputs of the occupant condition sensors 140, 142, 144, 146, and 154 and the vehicle condition sensor 148. Control of the energy absorbing device 80 may be responsive to the vehicle crash severity as sensed by the vehicle condition sensor 148. Control of the energy absorbing device 80 may also be responsive to the size, weight, and/or position of the occupant, or to any other factor that may be useful in determining how much resistance the knee bolster 20 should offer under load.

The apparatus 10 may be configured such that the controller 150 maintains the coil in either a normally energized condition or a normally de-energized condition. If the coil 110 is normally energized, the MR fluid 84 would have an initially high viscosity and thus prevent movement of the piston 120 in the cylinder 90 prior to actuation of the energy absorbing device 80. Upon sensing a vehicle condition for which deployment of the knee bolster 20 is desired, the controller 150 would reduce energization of or de-energize the coil 110 in order to allow deployment of the knee bolster. The controller 150 would activate the actuators 50 to deploy the knee bolster 20 to the condition of FIG. 2. Once the knee bolster 20 is deployed (e.g., after a predetermined time delay), the controller 150 would energize the coil 110, in accordance with sensed vehicle and occupant parameters, so that the energy absorbing device 80 provides the appropriate level of resistance and energy absorption.

If the coil 110 is normally de-energized, the MR fluid 84 would have an initially low viscosity and thus permit movement of the piston 120 in the cylinder 90. Upon sensing a vehicle condition for which deployment of the knee bolster 20 is desired, the controller 150 would activate the actuators 50 to deploy the knee bolsters 20. Once the knee bolster 20 is deployed (e.g., after a predetermined time delay), the controller 150 would energize the coil 110, in accordance with sensed vehicle and occupant parameters, so that the energy absorbing device 80 provides the appropriate level of resistance and energy absorption.

In the event of a crash condition involving sudden vehicle deceleration, or other event for which protection of the vehicle occupant may be desired, the sensors 140, 142, 144, 146, 148, and 154 provide appropriate output signals to the controller 150. According to the present invention, the controller 150 adjusts the viscosity of the MR fluid 84 in accordance with these output signals. The controller 150 determines how to adjust the viscosity of the MR fluid 84 by known means, such as a look-up table or an algorithm that utilizes the values provided by the sensors.

Under certain crash conditions, it may be desirable to adjust the rate at which the energy absorbing device 80 absorbs the energy of impacts with the knee bolster 20. It will be appreciated that the energy absorbing device 80 will absorb impact energy through the stroke length of the piston 120 in the cylinder 90. It is desirable to use as much of this stroke length as possible to absorb the impact energy of the occupant 28, particularly the occupant's leg 26. Thus, the controller 150 preferably adjusts the viscosity of the MR fluid 84 to help meet this goal.

For example, in the event of a sensed crash condition of relatively low severity, the occupant 28 will have a relatively low amount of kinetic energy to be absorbed by the knee bolster 20. Therefore, the energy absorbing device 80 can resist in a relatively weak manner the occupant's forward movement, and still absorb most or all of the kinetic energy of the occupant 28 during the stroke of the energy absorbing device. To achieve this result, the controller 150 may be adapted to cause the strength of the magnetic field generated by the coil 110 to be relatively low when a low severity crash condition is sensed. This relatively low magnetic field strength causes the MR fluid 84 to have a low viscosity, and thus decreases the resistance to movement of the knee bolster 20 in the second direction under load applied by the occupant 28. The knee bolster 20 will thus move in the second direction with a relatively low resistance provided by the energy absorbing device 80. The energy absorbing device 80 may thus absorb the relatively low kinetic energy of the occupant 28 through a substantial portion of the stroke of the device.

Alternatively, in the event of a sensed crash condition of relatively high severity, the occupant 28 will have a relatively high amount of kinetic energy to be absorbed by the energy absorbing device 80. Therefore, the energy absorbing device 80 may be adapted to resist in a relatively strong manner the occupant's forward movement, in order to absorb most or all of the kinetic energy of the occupant 28 during the stroke of the energy absorbing device. To achieve this result, the controller 150 may be adapted to cause the strength of the magnetic field generated by the coil 110 to be relatively high when a high severity crash condition is sensed. This relatively high magnetic field strength increases the viscosity of the MR fluid 84, and thus increases the resistance to movement of the knee bolster 20 in the second direction under load applied by the occupant 28. The knee bolster 20 will thus move in the second direction with a relatively high resistance provided by the energy absorbing device 80. The energy absorbing device 80 may thus absorb the relatively high kinetic energy of the occupant 28 through a substantial portion of the stroke of the device.

The controller 150 also may determine at the onset of the crash event whether to change the condition of the MR fluid 84 on the basis of sensed occupant conditions. The sensed occupant conditions may include the position of the occupant 28 as sensed by the occupant position sensors 144 or the seat position sensor 146. The sensed occupant conditions may also include the weight of the occupant 28 as sensed by the occupant weight sensor 142 or the seat belt tension as sensed by the seat belt tension sensor 140. The sensed occupant conditions may further include whether the seat belt is buckled, as indicated by the seat belt buckle switch 154.

For example, the occupant 28 may be positioned relatively close to the steering wheel 52 or the occupant may be below a predetermined weight. In this instance, at the onset of an event for which occupant protection is desired, the controller 150 may respond to these sensed conditions by decreasing the strength of the magnetic field generated by the coil 110. This would cause the viscosity of the MR fluid 84 to decrease, which would decrease the resistance applied by the energy absorbing device 80 to movement of the knee bolster 20 in the second direction.

Similarly, the occupant 28 may be positioned relatively far from the steering wheel 52 or the occupant may be above a predetermined weight. In this instance, at the onset of an event for which occupant protection is desired, the controller 150 may respond to these sensed conditions by increasing the strength of the magnetic field generated by the coil 110. This would cause the viscosity of the MR fluid 84 to increase, which would increase the resistance applied by the energy absorbing device 80 to movement of the knee bolster 20 in the second direction.

Vehicle and occupant conditions can change during the duration of a sensed event in ways that would make it desirable to change the energy absorbing capacity of the energy absorbing device 80. The present invention is advantageous in that the viscosity of the MR fluid 84 can be changed within a very short period of time, for example, in a few milliseconds. The sensors 140–148 and the controller 150 are operative to sense changing conditions during the sensed event and adjust the viscosity of the MR fluid 84 accordingly during the event. As a result, the resistance to movement of the knee bolster 20 in the second direction can be varied during the duration of the crash event, instead of only at the onset of the crash event, to adjust the protection being provided to the occupant. In addition, the viscosity of the MR fluid 84 can be controlled during the crash event to provide a desired "ride down" characteristic.

Figure 5:
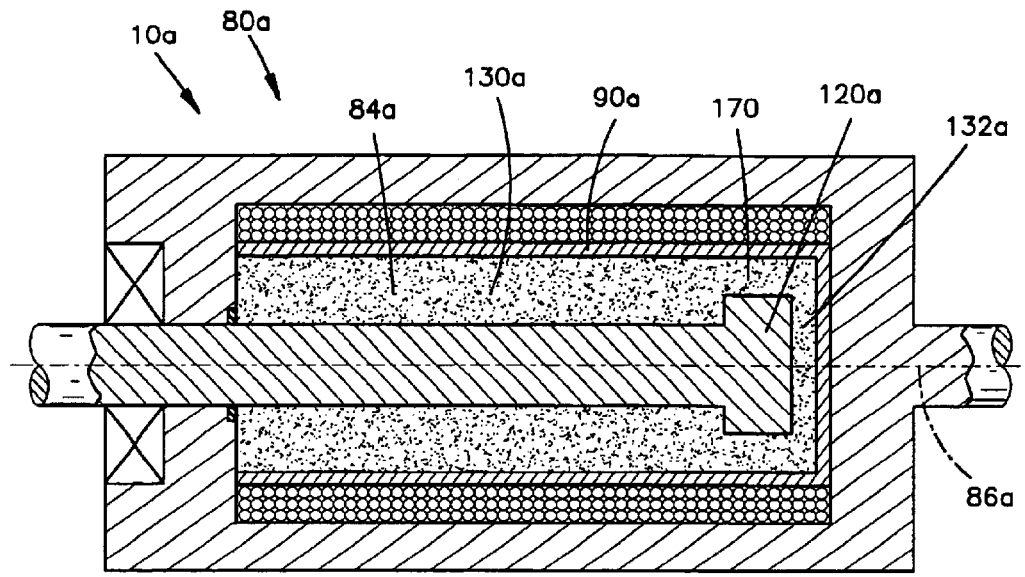
FIGS. 5 and 6 are schematic views of a portion of the apparatus of FIGS. 1 and 2 depicting the apparatus in stored and deployed positions, respectively, according to a second embodiment of the present invention.
Figure 6:
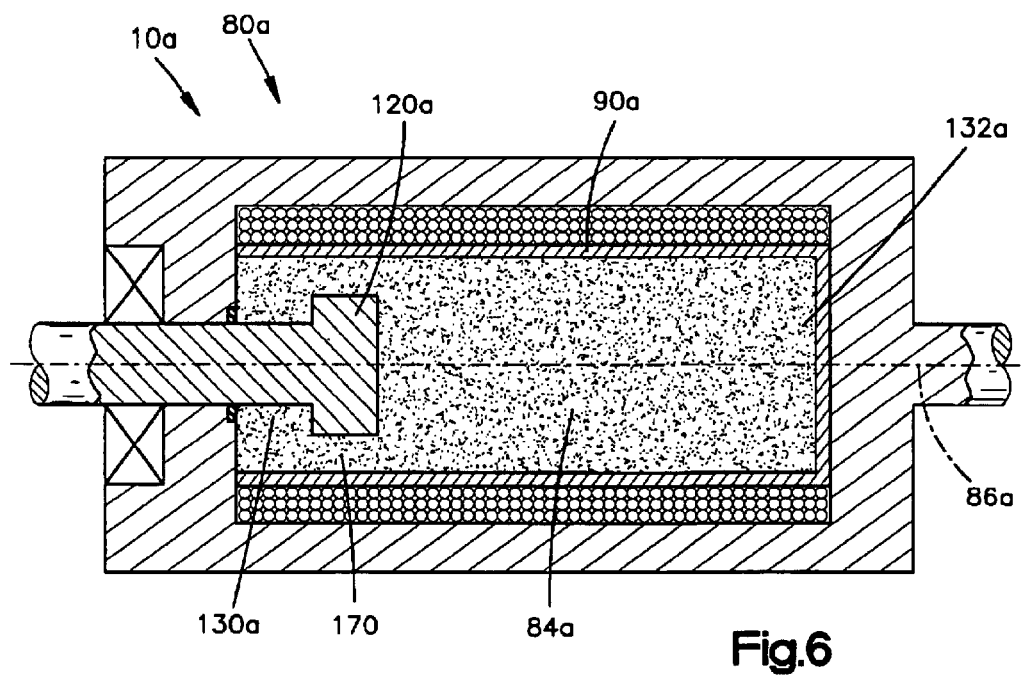

A second embodiment of the present invention is illustrated in FIGS. 5 and 6. The second embodiment of the invention is similar to the first embodiment of the invention illustrated in FIGS. 1–4. Accordingly, numerals similar to those of FIGS. 1–4 will be used in FIGS. 5 and 6 to identify similar components, the suffix letter "a" being associated with the numerals of FIGS. 5 and 6 to avoid confusion. The apparatus 10a of FIGS. 5 and 6 is identical to the apparatus 10 of FIGS. 1–4, except that the energy absorbing device 80a (FIGS. 5 and 6) has a different configuration than the energy absorbing device 80 of FIGS. 3 and 4.

FIG. 5 illustrates the energy absorbing device 80a in a first non-actuated condition that corresponds to FIG. 1. FIG. 6 illustrates the energy absorbing device 80a in a second actuated condition that corresponds to FIG. 2. Referring to FIGS. 5 and 6, the piston 120a of the energy absorbing device 80a has an outside diameter that is smaller than the inside diameter of the cylinder 90a. This creates an annular clearance or passage 170 between the piston 120a and the cylinder 90a. The passage 170 establishes fluid communication between the upper cylinder portion 130a and the lower cylinder portion 132a. The degree to which the outside diameter of the piston 120a is smaller than the inside diameter of the cylinder 90a may vary such that the passage 170 may have a desired size.

The MR fluid 84a resists axial movement of the piston 120a in the cylinder 90a. If the viscosity of the MR fluid 84a is low enough, the fluid in the cylinder 90a can flow through the passage 170 between the upper and lower cylinder portions 130a and 132a. This enables the piston 120a to move in the cylinder 90a through the body of MR fluid 84a, along the axis 86a of the energy absorbing device 80a. If the viscosity of the MR fluid 84a is high enough, the fluid cannot flow through the passage 170, thereby blocking movement of the piston 120a in the cylinder 90a. Varying the viscosity of the MR fluid 84a thus varies the rate of flow of the fluid through the passage 170, and thereby varies the resistance to movement of the piston 120a axially in the cylinder 90a.

In the event of a crash condition involving sudden vehicle deceleration, or other event for which protection of the vehicle occupant may be desired, the viscosity of the MR fluid 84a may be varied in a manner similar or identical to that described above in reference to the first embodiment of FIGS. 1–4, taking into account vehicle and occupant conditions sensed by the sensors and determined by the controller. As a result, the resistance to movement of the piston 120a relative to the cylinder 90a may also be varied in response to the sensed conditions. Thus, it will be appreciated that the energy absorbing device 80a of the second embodiment may be used to vary the resistance to movement of a vehicle occupant protection device, such as the knee bolster of FIGS. 1 and 2, relative to a vehicle. It will be further appreciated that the viscosity of the MR fluid 84a may be adjusted to help use as much of the stroke length of the energy absorbing device 80a as possible to absorb the impact energy of a vehicle occupant.

Figure 7:
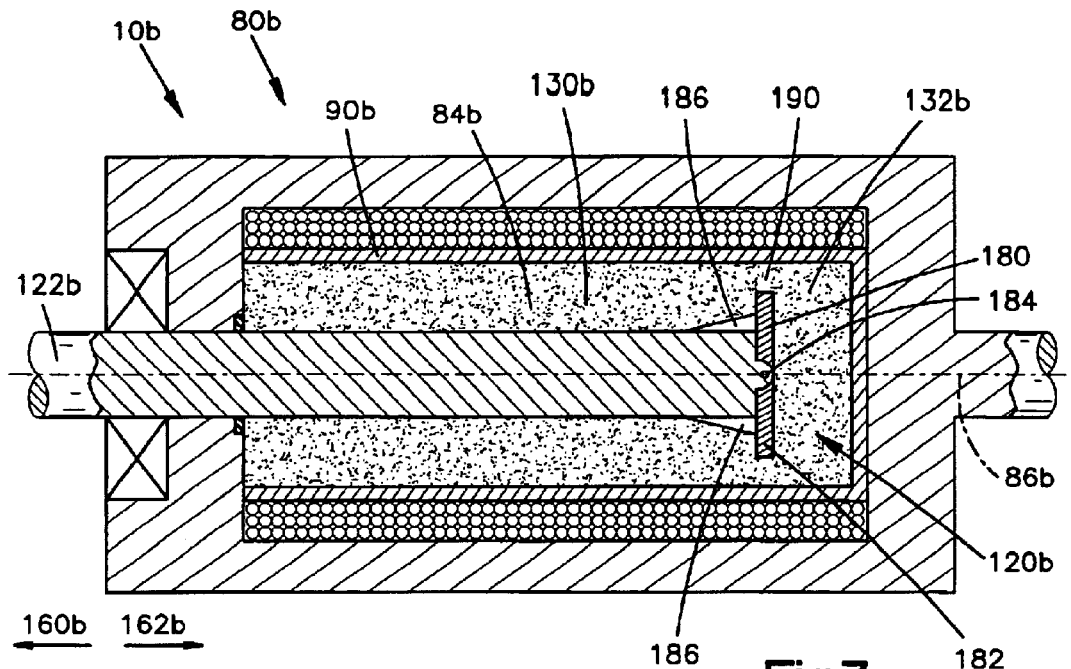
FIGS. 7 and 8 are schematic views of a portion of the apparatus of FIGS. 1 and 2 depicting the apparatus in stored and deployed positions, respectively, according to a third embodiment of the present invention.
Figure 8:
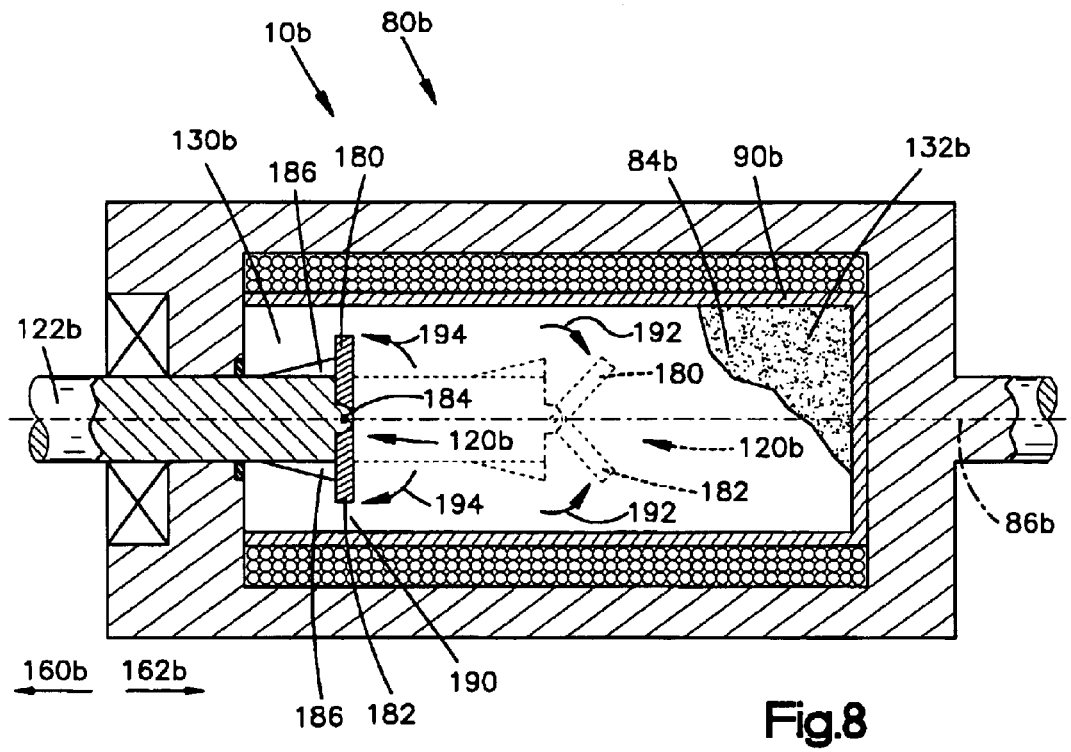

A third embodiment of the present invention is illustrated in FIGS. 7 and 8. The third embodiment of the invention is similar to the first embodiment of the invention illustrated in FIGS. 1–4. Accordingly, numerals similar to those of FIGS. 1–4 will be used in FIGS. 7 and 8 to identify similar components, the suffix letter "b" being associated with the numerals of FIGS. 7 and 8 to avoid confusion. The apparatus 10b of FIGS. 7 and 8 is identical to the apparatus 10 of FIGS. 1–4, except that the energy absorbing device 80b (FIGS. 7 and 8) has a different configuration than the energy absorbing device 80 of FIGS. 3 and 4.

FIG. 7 illustrates the energy absorbing device 80b in a first non-actuated condition that corresponds to FIG. 1. FIG. 8 illustrates the energy absorbing device 80b in a second actuated condition that corresponds to FIG. 2. Referring to FIGS. 7 and 8, the piston 120b of the energy absorbing device 80b includes first and second portions 180 and 182, respectively that are pivotally connected to the shaft 122b. The first and second portions 180 and 182 are pivotable relative to the shaft 122b about a pivot point 184. As shown in FIGS. 7 and 8, the shaft 122b may include shoulder portions 186 for helping to support the first and second portions 180 and 182 and limit pivotal movement of the portions.

The piston 120b has an extended position wherein the first and second portions 180 and 182 extend away from each other in opposite directions generally perpendicular to the axis 86b. When in the extended position, the first and second portions 180 and 182 rest against the shoulder portions 186. The piston 120b has a retracted position wherein the first and second portions 180 and 182 pivot away from the extended position and away from the shoulder portions 186, extending at acute angles relative to the axis 86b. The extended position is illustrated in solid lines in FIGS. 7 and 8. The retracted position is illustrated in dashed lines in FIG. 8.

The first and second portions 180 and 182 form an annular clearance or passage 190 between the piston 120b and the cylinder 90b. The passage 190 establishes fluid communication between the upper cylinder portion 130b and the lower cylinder portion 132b. When the piston 120b is in the extended position, the passage 190 has a predetermined size or cross-sectional area. When the piston 120b is in the retracted position, the passage 190 has a larger size or cross-sectional area.

The MR fluid 84b resists axial movement of the piston 120b in the cylinder 90b. If the viscosity of the MR fluid 84b is low enough, the fluid in the cylinder 90b can flow through the passage 190 between the upper cylinder portion 130b and lower cylinder portion 132b. This enables the piston 120b to move in the cylinder 90b through the body of MR fluid 84b, along the axis 86b of the energy absorbing device 80b. If the viscosity of the MR fluid 84b is high enough, the fluid cannot flow through the passage 190, thereby blocking movement of the piston 120b in the cylinder 90b. Varying the viscosity of the MR fluid 84b thus varies the rate of flow of the fluid through the passage 190, and thereby varies the resistance to movement of the piston 120b axially in the cylinder 90b.

The rate of flow of the MR fluid 84b through the passage 190 also depends on whether the first and second portions 180 and 182 of the piston 120b are extended or retracted. When the piston 120b is in the extended position, the relatively small area of the passage 190 lowers the flow rate of MR fluid 84b through the passage for a given amount of force urging the piston to move axially along the cylinder 90b. When the piston 120b is in the retracted position, the relatively large area of the passage 190 increases the flow rate of MR fluid 84b through the passage.

When the piston moves in the first direction 160b, the MR fluid 84b acts on the first and second portions 180 and 182 and urges the portions to the retracted position. This is shown by the piston 120b and shaft 122b illustrated in dashed lines in FIG. 8. As the piston 120b moves through the MR fluid 84b in the first direction 160b, the first and second portions 180 and 182 pivot in the direction of the curved arrows labeled 192 in FIG. 8. When the piston 120b is urged to the retracted position by movement in the first direction 160b, the size or area of the passage 190 increases, which helps reduce resistance to axial movement of the piston in the first direction along the cylinder 90b.

When the piston moves in the second direction 162b, the MR fluid 84b acts on the first and second portions 180 and 182 and urges the portions to the extended position. This is shown by the piston 120b and shaft 122b illustrated in solid lines in FIG. 8. As the piston 120b moves through the MR fluid 84b in the second direction 162b, the first and second portions 180 and 182 pivot in the direction of the curved arrows labeled 194 in FIG. 8. When the piston 120b is urged to the extended position by movement in the second direction 162b, the size or area of the passage 190 decreases, which helps reduce resistance to axial movement of the piston in the second direction along the cylinder 90b.

In the event of a crash condition involving sudden vehicle deceleration, or other event for which protection of the vehicle occupant may be desired, a vehicle occupant protection device (e.g., the knee bolster of FIGS. 1 and 2) may be deployed in the first direction 160b. According to the energy absorbing device 80b of the third embodiment, when the knee bolster is deployed, the piston 120b moves with the knee bolster in the first direction 160b, which causes the portions 180 and 182 to pivot to the retracted position to lower resistance to movement of the piston and knee bolster in the first direction. The energy absorbing device 80b thus moves from the non-actuated condition of FIG. 7 to the actuated condition of FIG. 8.

Once the energy absorbing device 80b is in the actuated condition (FIG. 8), movement of the piston 120b in the second direction 162b will urge the portions 180 and 182 to the extended position, which increases resistance to movement of the piston in the second direction. In addition to this, the viscosity of the MR fluid 84b may be varied in a manner similar or identical to that described above in reference to the first embodiment of FIGS. 1–4, taking into account vehicle and occupant conditions sensed by the sensors and determined by the controller. As a result, the resistance to movement of the piston 120b relative to the cylinder 90b may also be varied in response to the sensed conditions. Thus, it will be appreciated that the energy absorbing device 80b of the third embodiment may be used to vary the resistance to movement of a vehicle occupant protection device, such as the knee bolster of FIGS. 1 and 2, relative to a vehicle. It will be further appreciated that the viscosity of the MR fluid 84b may be adjusted to help use as much of the stroke length of the energy absorbing device 80b as possible to absorb the impact energy of a vehicle occupant.

Figure 9:
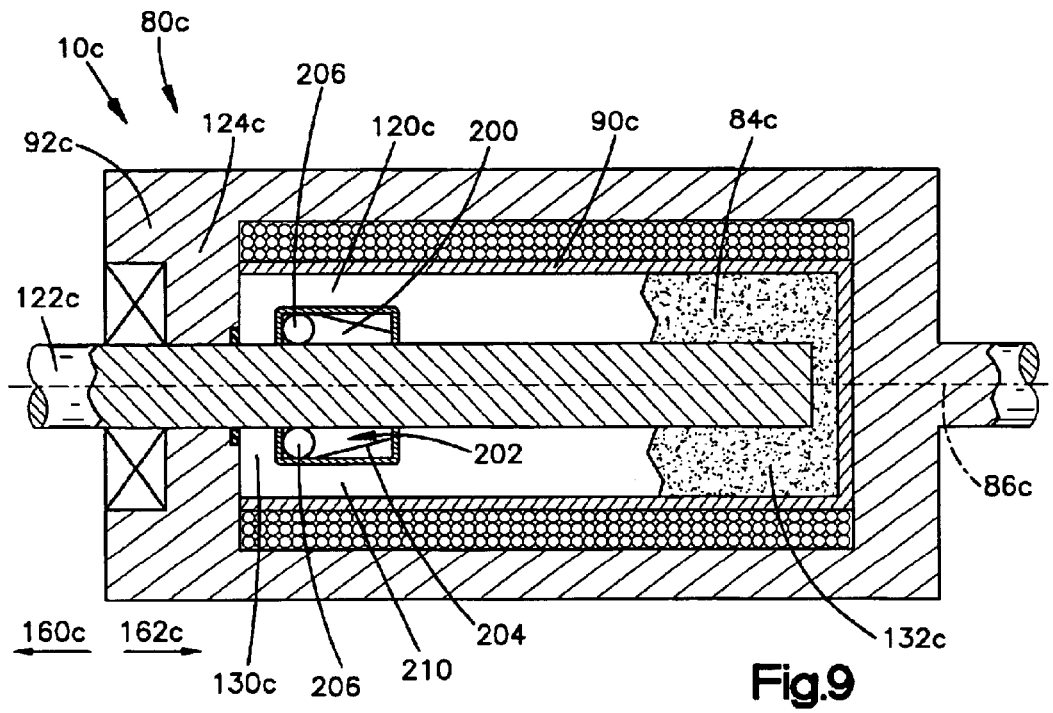
FIGS. 9 and 10 are schematic views of a portion of the apparatus of FIGS. 1 and 2 depicting the apparatus in stored and deployed positions, respectively, according to a fourth embodiment of the present invention.
Figure 10:
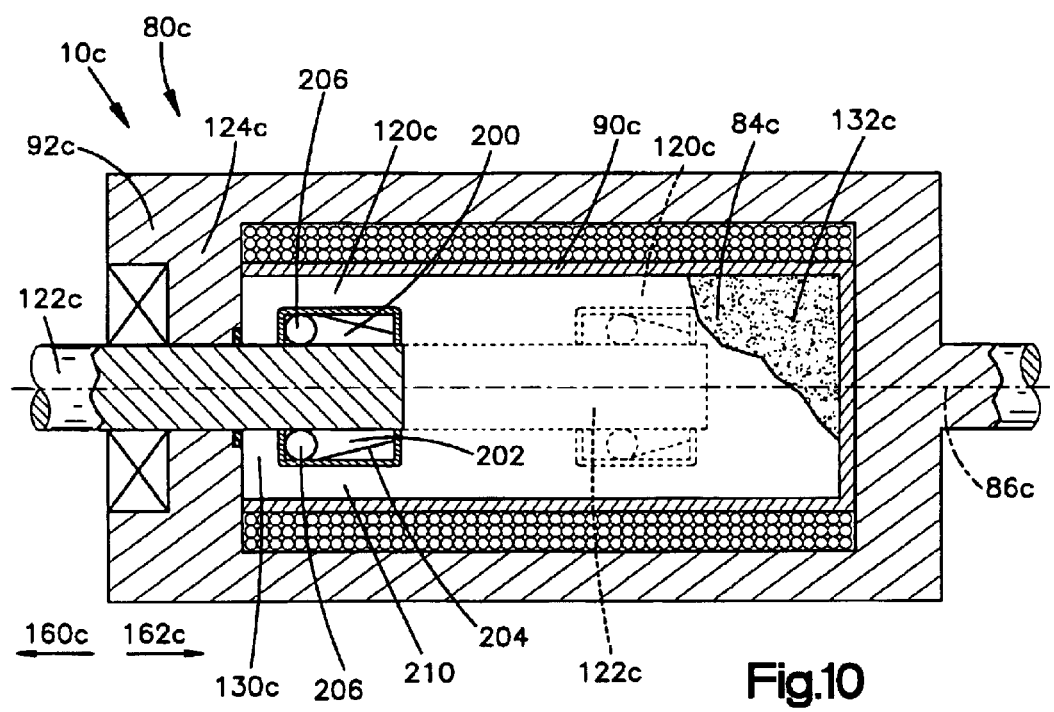

A fourth embodiment of the present invention is illustrated in FIGS. 9 and 10. The fourth embodiment of the invention is similar to the first embodiment of the invention illustrated in FIGS. 1–4. Accordingly, numerals similar to those of FIGS. 1–4 will be used in FIGS. 9 and 10 to identify similar components, the suffix letter "c" being associated with the numerals of FIGS. 9 and 10 to avoid confusion. The apparatus 10c of FIGS. 9 and 10 is identical to the apparatus 10 of FIGS. 1–4, except that the energy absorbing device 80c (FIGS. 9 and 10) has a different configuration than the energy absorbing device 80 of FIGS. 3 and 4.

FIG. 9 illustrates the energy absorbing device 80c in a first non-actuated condition that corresponds to FIG. 1. FIG. 10 illustrates the energy absorbing device 80c in a second actuated condition that corresponds to FIG. 2. Referring to FIGS. 9 and 10, the piston 120c of the energy absorbing device 80c comprises a hollow chamber 200 through which the shaft 122c extends. In the non-actuated condition of the energy absorbing device 80c, the piston 120c is positioned in the cylinder 90c adjacent or near the second end 124c of the housing 92c.

The shaft 122c is slidable through the piston 120c in the first and second directions 160c and 162c. The piston 120c includes a mechanism 202 that permits movement of the shaft 122c relative to the piston 120c in the first direction 160c and blocks movement of the shaft relative to the piston in the second direction 162c. The mechanism 202 is illustrated in FIGS. 9 and 10 is a ball-ramp clamping mechanism. The mechanism 202 could, however, have alternative configurations, such as a ratchet mechanism or a wedge clamp mechanism.

The mechanism 202 includes a ramp 204 and at least one ball 206, such as a ball bearing. The ramp 204 has a surface that is presented facing the shaft 122c and extends at an acute angle toward the shaft. In the embodiment illustrated in FIGS. 9 and 10, the ramp 204 extends axially around the interior of the piston 120c. The mechanism 202 may thus include a plurality of balls 206 positioned axially around shaft 122c in the chamber 200 of the piston 120c. It will be appreciated, however, that the ramp 204 may extend around an axial portion of the interior of the piston 120c or may comprise several ramps spaced axially around the interior of the piston. In these instances, the mechanism 202 would include an appropriate number of balls 206 commensurate with the number, spacing, and axial extent of the ramp(s) 204.

The piston 120c has an outside diameter that is smaller than the inside diameter of the cylinder 90c. This creates an annular clearance or passage 210 between the piston 120c and the cylinder 90c. The passage 210 establishes fluid communication between the upper cylinder portion 130c and the lower cylinder portion 132c. The degree to which the outside diameter of the piston 120c is smaller than the inside diameter of the cylinder 90c may vary such that the passage 210 may have a desired size.

In the event of a crash condition involving sudden vehicle deceleration, or other event for which protection of the vehicle occupant may be desired, a vehicle occupant protection device (e.g., the knee bolster of FIGS. 1 and 2) may be deployed in the first direction 160c. According to the energy absorbing device 80c of the fourth embodiment, when the knee bolster is deployed, the shaft 122c moves with the knee bolster and slides through the chamber 200 of the piston 120c in the first direction 160c. Since movement of the shaft 122c in the first direction imparts little or no movement of the piston 120c, there is little or no displacement or movement of the MR fluid 84c between the upper and lower cylinder portions 130c and 132c through the passage 210. The energy absorbing device 80c thus moves from the non-actuated condition of FIG. 9 to the actuated condition of FIG. 10 with a minimal amount of resistance from the MR fluid 84c, which facilitates deployment of the knee bolster.

Once the energy absorbing device 80c is in the actuated condition (FIG. 10), movement of the shaft 122c in the second direction 162c will urge the balls 206 to move in the second direction onto and along the ramp 204. As the balls 206 move along the ramp 204 in the second direction 162c, the balls become wedged between the ramp and the shaft 122c. The piston 120c is thus clamped onto the shaft 122c by the mechanism 200, which causes the piston to move in the second direction with the shaft. This is shown in FIG. 10 by the piston 120c and shaft 122c illustrated in dashed lines.

The MR fluid 84c resists axial movement of the piston 120c in the second direction 162c in the cylinder 90c. If the viscosity of the MR fluid 84c is low enough, the fluid in the cylinder 90c can flow through the passage 210 between the upper cylinder portion 130c and lower cylinder portion 132c. This enables the piston 120c to move in the cylinder 90c through the body of MR fluid 84c, along the axis 86c of the energy absorbing device 80c. If the viscosity of the MR fluid 84c is high enough, the fluid cannot flow through the passage 210, thereby blocking axial movement of the piston 120c in the cylinder 90c. Varying the viscosity of the MR fluid 84c thus varies the rate of flow of the fluid through the passage 210, and thereby varies the resistance to movement of the piston 120c in the second direction 162c in the cylinder 90c.

The viscosity of the MR fluid 84c may be varied in a manner similar or identical to that described above in reference to the first embodiment of FIGS. 1–4, taking into account vehicle and occupant conditions sensed by the sensors and determined by the controller. As a result, the resistance to movement of the piston 120c relative to the cylinder 90c may also be varied in response to the sensed conditions. Thus, it will be appreciated that the energy absorbing device 80c of the fourth embodiment may be used to vary the resistance to movement of a vehicle occupant protection device, such as the knee bolster of FIGS. 1 and 2, relative to a vehicle. It will be further appreciated that the viscosity of the MR fluid 84c may be adjusted to help use as much of the stroke length of the energy absorbing device 80c as possible to absorb the impact energy of a vehicle occupant.

Figure 11:
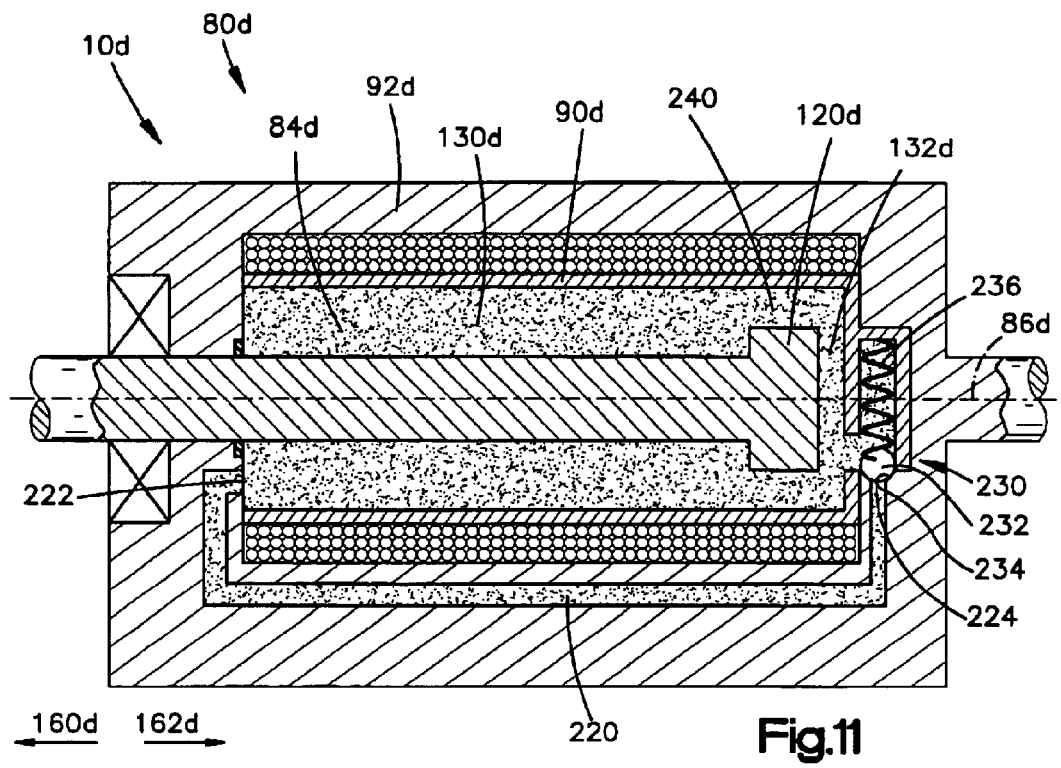
Figure 12:
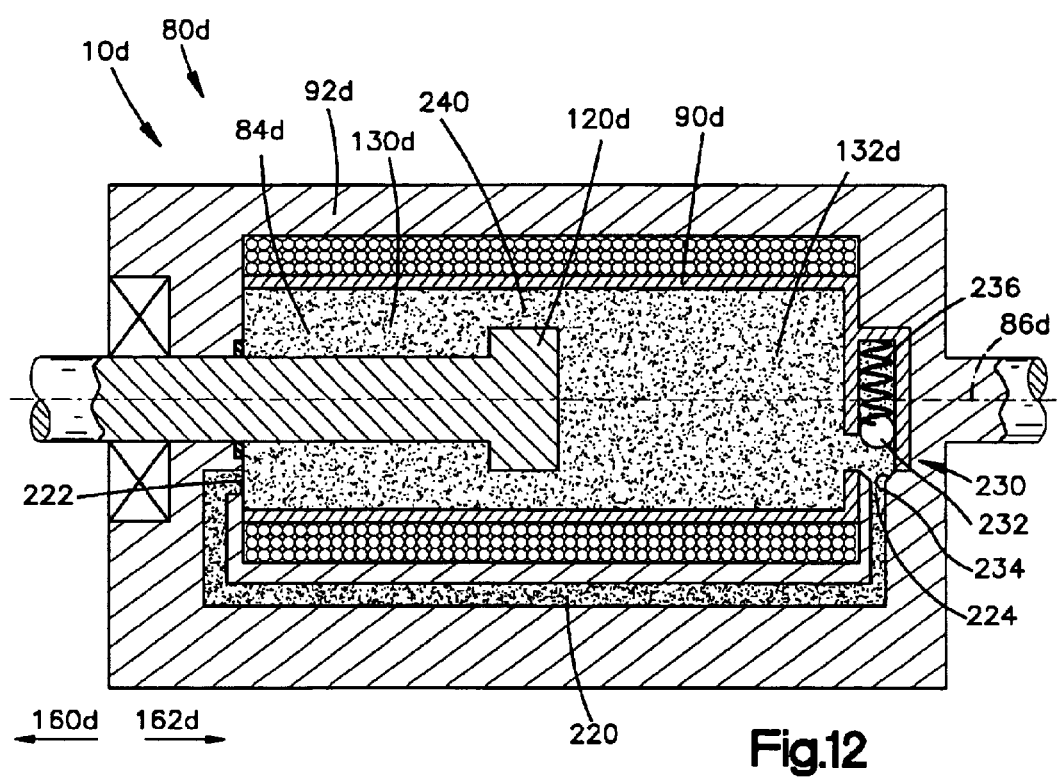

A fifth embodiment of the present invention is illustrated in FIGS. 11–13. The fifth embodiment of the invention is similar to the first embodiment of the invention illustrated in FIGS. 1–4. Accordingly, numerals similar to those of FIGS. 1–4 will be used in FIGS. 11–13 to identify similar components, the suffix letter "d" being associated with the numerals of FIGS. 11–13 to avoid confusion. The apparatus 10d of FIGS. 11–13 is identical to the apparatus 10 of FIGS.

1–4, except that the energy absorbing device 80d (FIGS. 11–13) has a different configuration than the energy absorbing device 80 of FIGS. 3 and 4.

FIG. 11 illustrates the energy absorbing device 80d in a first non-actuated condition that corresponds to FIG. 1. FIG. 13 illustrates the energy absorbing device 80d in a second actuated condition that corresponds to FIG. 2. FIG. 12 illustrates the energy absorbing device 80d in a mid-travel position between the non-actuated position and actuated position.

Referring to FIGS. 11–13, the energy absorbing device 80d of the fifth embodiment includes a bypass channel 220 that provide fluid communication between the upper cylinder portion 130d and the lower cylinder portion 132d. The bypass channel 220 has a first end 222 in fluid communication with the upper cylinder portion 130d and a second end 224 in fluid communication with the lower cylinder portion 132d. The bypass channel 220 extends through the housing 92d external to the cylinder 90d.

The energy absorbing device 80d of the fifth embodiment also includes a bypass valve 230 positioned at the second end 224 of the bypass channel 220. The bypass valve 230 includes a ball stop 232 biased into a ball seat 234 by a spring 236. The ball stop 232, when seated in the ball seat 234, blocks flow of the MR fluid 84d through the bypass channel 220. When the ball stop 232 is moved against the bias of the spring 236 out of the seat 234 (see FIG. 12), flow of the MR fluid 84d through the bypass channel 220 is enabled.

Those skilled in the art will appreciate that the bypass valve 230 and/or the bypass channel 220 may have alternative configurations. For example, the bypass valve 230 may comprise a valve separate from and external to the cylinder. The bypass channel 220 may comprise a conduit or tubing separate from and external to the cylinder.

The piston 120d has an outside diameter that is smaller than the inside diameter of the cylinder 90d. This creates an annular clearance or passage 240 between the piston 120d and the cylinder 90d. The passage 240 establishes fluid communication between the upper cylinder portion 130d and the lower cylinder portion 132d. The degree to which the outside diameter of the piston 120d is smaller than the inside diameter of the cylinder 90d may vary such that the passage 240 may have a desired size.

In the event of a crash condition involving sudden vehicle deceleration, or other event for which protection of the vehicle occupant may be desired, a vehicle occupant protection device (e.g., the knee bolster of FIGS. 1 and 2) may be deployed in the first direction 160d. According to the energy absorbing device 80d of the fifth embodiment, when the knee bolster is deployed, the shaft 122d and the piston 120d move with the knee bolster in the first direction 160d.

Referring to FIG. 12, movement of the piston 120d in the first direction 160d acts on the MR fluid 84d in the upper cylinder portion 130d which increases the fluid pressure in the upper cylinder portion. This causes the fluid pressure in the bypass channel 220 to increase to a level above the fluid pressure in the lower cylinder portion 132d. The pressurized MR fluid 84d in the bypass channel 220 acts on the ball stop 232 and urges the ball stop against the bias of the spring 236 and against the fluid pressure in the lower cylinder portion 132d. As a result, the ball stop 232 is urged out of the ball seat 234 to the position illustrated in FIG. 12, thus opening the bypass valve 230.

The bypass valve 230, when opened, permits the MR fluid 84d to flow through the bypass channel 220 from the upper cylinder portion 130d to the lower cylinder portion 132d as the piston 120d moves in the first direction 160d in the cylinder 90d. Flow of the MR fluid 84d through the bypass channel 220 helps reduce resistance to movement of the piston 120d in the first direction 160d in the cylinder 122d. This helps permit the energy absorbing device 80d to move from the non-actuated condition of FIG. 11 to the actuated condition of FIG. 13 with a minimal amount of resistance from the MR fluid 84d, which facilitates deployment of the knee bolster.

Once the energy absorbing device 80d is in the actuated condition (FIG. 13) and the piston 120d stops moving in the first direction 160d, the fluid pressure equalizes between the upper and lower cylinder portions 130d and 132d. As a result, the spring 236 biases the ball stop 232 into the seat 234, thus closing the bypass valve 230. Movement of the piston 120d in the second direction 162d causes the fluid pressure of the MR fluid 84d in the lower cylinder portion 132d to increase, which urges further the ball 232 into the stop 234. As a result, when the piston 120d moves in the second direction 162d, the bypass valve 230 is maintained in the closed condition illustrated in FIG. 13. Thus, when the piston 120d moves in the second direction, the MR fluid 84d flows from the upper cylinder portion 130d to the lower cylinder portion 132d through the passage 240.

The MR fluid 84d resists axial movement of the piston 120d in the second direction 162d in the cylinder 90d. If the viscosity of the MR fluid 84d is low enough, the fluid in the cylinder 90d can flow through the passage 240 between the upper cylinder portion 130d and lower cylinder portion 132d. This enables the piston 120d to move in the cylinder 90d through the body of MR fluid 84d, along the axis 86d of the energy absorbing device 80d. If the viscosity of the MR fluid 84d is high enough, the fluid cannot flow through the passage 240, thereby blocking axial movement of the piston 120d in the cylinder 90d. Varying the viscosity of the MR fluid 84d thus varies the rate of flow of the fluid through the passage 240, and thereby varies the resistance to movement of the piston 120d in the second direction 162d in the cylinder 90d.

The viscosity of the MR fluid 84d may be varied in a manner similar or identical to that described above in reference to the first embodiment of FIGS. 1–4, taking into account vehicle and occupant conditions sensed by the sensors and determined by the controller. As a result, the resistance to movement of the piston 120d relative to the cylinder 90d may also be varied in response to the sensed conditions. Thus, it will be appreciated that the energy absorbing device 80d of the fifth embodiment may be used to vary the resistance to movement of a vehicle occupant protection device, such as the knee bolster of FIGS. 1 and 2, relative to a vehicle. It will be further appreciated that the viscosity of the MR fluid 84d may be adjusted to help use as much of the stroke length of the energy absorbing device 80d as possible to absorb the impact energy of a vehicle occupant.

The energy absorbing devices of the embodiments illustrated in FIGS. 1–13 have been illustrated and described as being incorporated with a knee bolster that is deployable by actuators. Those skilled in the art, however, will appreciate that the energy absorbing devices of the present invention may be incorporated with a non-deployable knee bolster that does not include actuators. This is illustrated in FIG. 14. In FIG. 14, numerals similar to those of FIGS. 1–13 are used to identify similar components, the suffix letter "e" being associated with the numerals of FIG. 14 to avoid confusion.

In the embodiment illustrated in FIG. 14, the knee bolster 20e forms part of a lower portion 22e of the dashboard 24e of the vehicle 12e. The knee bolster 20e has an outer surface 40e that is presented generally downward and rearward in the vehicle 12e toward a seat 42e of the vehicle and toward the vehicle occupant 28e. More specifically, the knee bolster 20e has an outer surface 40e presented toward the occupant's legs 26e.

As shown in FIG. 14, the apparatus 10e includes an energy absorbing device 80e. The energy absorbing device 80e helps support the knee bolster 20e in the position of FIG. 14 and helps absorb impact forces with the knee bolster. The energy absorbing device 80e may have the construction of any of the energy absorbing apparatuses of the first through fifth embodiments (See FIGS. 1–13). Since the knee-bolster 20e of FIG. 14 is non-deployable, it will be appreciated that the energy absorbing device 80e is maintained in an extended position prior to impacts with the knee bolster, such as those illustrated in FIGS. 4, 6, 8, 10, and 13.

Since the knee bolster 20e of the embodiment illustrated in FIG. 14 is non-deployable, it is not necessary for the piston and shaft of the energy absorbing device 80e to move (i.e., deploy) in the first direction as shown and described in the embodiments of FIGS. 1–13. Therefore, it will be appreciated that the advantages realized by the energy absorbing devices adapted to facilitate deployment of the knee bolster (i.e., the embodiments of FIGS. 7–13) may not be necessary in the embodiment of FIG. 14. Thus, the constructions of the energy absorbing devices illustrated in FIGS. 3–6 may be more appropriate for incorporation in the apparatus 10e of FIG. 14.

In the event of a crash condition involving sudden vehicle deceleration, or other event for which protection of the vehicle occupant may be desired, the sensors 140e, 142e, 144e, 146e, 148e, and 154e provide appropriate output signals to the controller 150e. The controller 150e adjusts the viscosity of the MR fluid (not shown in FIG. 14) of the energy absorbing device 80e in accordance with these output signals. The controller 150e determines how to adjust the viscosity of the MR fluid by known means, such as a look-up table or an algorithm that utilizes the values provided by the sensors. The rate at which the energy absorbing device 80e absorbs the energy of impacts with the knee bolster 20e is adjusted according to the sensed vehicle and occupant conditions in the same manner as described above in reference to the first embodiment of FIGS. 1–4.

During the sensed event, the occupant 28e, particularly the occupant's legs 26e, may move into contact with the knee bolster 20e. The controller 150e preferably adjusts the viscosity of the MR fluid in order to use as much of the stroke length of the energy absorbing device 80e as possible to absorb the impact energy of the occupant 28e with the knee bolster 20e. The controller 150e may also sense changing conditions during the sensed event and adjust the viscosity of the MR fluid accordingly during the event.

From the above description of the invention, those skilled in the art will perceive improvements, changes and modifications. Such improvements, changes and modifications within the skill of the art are intended to be covered by the appended claims.

Having described the invention, we claim:

1. An apparatus for helping to protect an occupant of a vehicle, said apparatus comprising:
    a knee bolster; and
    an energy absorbing device interposed between said knee bolster and the vehicle, said energy absorbing device comprising:
        a cylinder containing a field responsive fluid having a viscosity that varies in response to an energy field acting on said field responsive fluid;
        a piston movable in said cylinder and coupled with said knee bolster, an annular clearance between said piston and said cylinder forming a passage through which said field responsive fluid flows upon movement of said knee bolster; and
        means for varying the viscosity of said field responsive fluid to vary the rate of flow of said field responsive fluid through said at least one passage and thereby vary the resistance to movement of said knee bolster relative to the vehicle.

2. An apparatus as set forth in claim 1 wherein said means for varying the viscosity of said field responsive fluid comprises a device for generating a magnetic field acting on said field responsive fluid, said field responsive fluid comprising a magneto-rheological fluid having a viscosity that varies in response to a change in said magnetic field.

3. An apparatus as set forth in claim 2 wherein said means for varying the viscosity of said field responsive fluid further comprises at least one of occupant condition sensors and vehicle condition sensors operative to provide condition signals, and a controller for receiving said condition signals and controlling said magnetic field in response to said condition signals to control the resistance to movement of said knee bolster.

4. An apparatus as set forth in claim 2 wherein said device for generating a magnetic field comprises a coil extending around said field responsive fluid and a controller for controlling flow of electric current through said coil to vary said magnetic field.

5. An apparatus as set forth in claim 4 wherein said means for varying the viscosity of said fluid further comprises at least one of occupant condition sensors and vehicle condition sensors operative to provide condition signals, and a controller for receiving said condition signals and controlling and supplying electric current to said coil in response to said condition signals to control said magnetic field and thereby control the resistance to movement of said knee bolster.

6. An apparatus as set forth in claim 1, further comprising a housing connected to the vehicle and supporting said cylinder.

7. Apparatus as recited in claim 1, wherein said knee bolster is actuatable to move in a first direction away from a dashboard of the vehicle to a deployed position, said energy absorbing device resisting movement of said knee bolster relative to the vehicle in a second direction opposite said first direction.

8. An apparatus as set forth in claim 1 further comprising a passage extending through said piston.

9. An apparatus as set forth in claim 1 wherein said piston comprises first and second portions pivotally connected to said shaft, said first and second portions pivoting in a first pivotal direction and increasing said clearance upon movement of said piston in a first direction, said first and second portions pivoting in a second pivotal direction opposite said first pivotal direction and decreasing said clearance upon movement of said piston in a second direction opposite said first direction.

10. An apparatus as set forth in claim 1 wherein said piston divides said cylinder into an upper cylinder portion and a lower cylinder portion, said energy absorbing device further including a bypass channel providing fluid connectivity between said upper and lower cylinder portions and a bypass valve, said bypass valve permitting flow of said field responsive fluid between said upper and lower cylinder portions when said piston moves in a first direction in said cylinder, said bypass valve blocking flow of said field responsive fluid between said upper and lower cylinder portions when said piston moves in a second direction in said cylinder opposite said first direction.

11. An apparatus for helping to protect an occupant of a vehicle, said apparatus comprising:

a knee bolster;

a cylinder containing a field responsive fluid having a viscosity that varies in response to an energy field acting on said field responsive fluid;

a piston movable in said cylinder;

a passage through which said field responsive fluid flows upon movement of said piston in said cylinder;

a shaft coupled with said knee bolster;

means for permitting said shaft to move relative to said piston in a first direction and for engaging said shaft to cause said piston to move with said shaft in said second direction opposite said first direction; and means for varying the viscosity of said field responsive fluid to vary the rate of flow of said field responsive fluid through said passage.

* * * * *